(12) United States Patent
Levine (10) Patent No.: US 7,316,433 B2
(45) Date of Patent: Jan. 8, 2008

(54) LICENSE-PLATE FRAME BUMPER GUARD

(76) Inventor: Jeffrey K Levine, 11 Riverside Dr., New York, NY (US) 10023

( * ) Notice: Subject to any disclaimer, the term of this patent is extended or adjusted under 35 U.S.C. 154(b) by 262 days.

(21) Appl. No.: 11/065,905

(22) Filed: Feb. 25, 2005

(65) Prior Publication Data

US 2006/0191173 A1 Aug. 31, 2006

(51) Int. Cl.
*B60R 19/50* (2006.01)
(52) U.S. Cl. .................. 293/142; 293/102; 40/209
(58) Field of Classification Search ............. 293/24, 293/102, 114, 115, 142, 144; 280/770, 727; 40/209, 200; D12/167, 169, 171, 172
See application file for complete search history.

(56) References Cited

U.S. PATENT DOCUMENTS 4,011,675 A * 3/1977 Herring .................... 40/209
5,139,295 A * 8/1992 Escobedo ................ 293/117
2006/0156595 A1* 7/2006 Kasak et al. .............. 40/209

* cited by examiner

*Primary Examiner*—Jason S Morrow
(74) *Attorney, Agent, or Firm*—Ostrolenk, Faber, Gerb & Soffen, LLP (57) ABSTRACT

A bumper guard mountable to a vehicle license-plate mounting fixture, the mounting fixture being adapted to receive a license-plate having at least one mounting recess. The bumper guard comprises a first member having a front and rear surface. The rear surface is configured to be disposed adjacent to the mounting fixture. The license plate can be disposed on the front surface of the first member or on the rear surface between the rear surface of the first member and the mounting fixture. At least one recess in the first member is arranged to align with a fastening member of the vehicle license plate mounting fixture. At least one guard arm extends a predetermined distance from the front surface of the first member. The first member is mountable to the vehicle license plate fixture fastening member by at least one fastening device.

40 Claims, 6 Drawing Sheets

LICENSE-PLATE FRAME BUMPER GUARD

BACKGROUND OF THE INVENTION

The present invention relates to automotive protective attachments, and more specifically to a bumper guard attachable at a license-plate mounting area via license-plate mounting fasteners to a vehicle's bumper or body for absorbing low-speed impacts and preventing damage to the bumper and/or body surface.

According to the applicant's knowledge, the current state of the art includes bumper guards which extend in front of and surround the license-plate, but are mounted underneath the bumper, to the bumper support or otherwise to the vehicle undercarriage. Such undercarriage type mountings usually requires drilling holes in the support structure for mounting what is usually a heavy grade steel guard. One such device is illustrated in U.S. Des. Pat. No. 275,475 issued to Turkleson. Other existing bumper guards are custom designed to the shape of a particular vehicle's bumper or body panel. These require substantial work and/or expense to attach or are limited in application. Accordingly, there is a need for a cost effective bumper guard easily attachable to most vehicles despite the varying bumper and body shapes associated with different makes and models.

External metal bumpers are typically not used on modern vehicles. Most bumpers are now made, in whole or in part, of rubber or plastic composites that crack, puncture or scratch upon impact (sometimes at even low force impacts) and which cover an interiorly located metal structure. Also, today's bumpers are often painted with high gloss paints which make unpleasant scuffs and dings more noticeable. Repairing or replacing a bumper because of structural and/or cosmetic damage resulting from impacts can carry substantial costs. Therefore, there is a desire to use a bumper guard to avoid the scrapes, nicks, cracks and dings associated with an impact to a bumper or the vehicle body. However, currently existing bumper guards require custom bumper guards shaped to accommodate the curve of a particular vehicle's bumper design and/or require modification (i.e., drilling holes) to the bumper or bumper support in order to mount existing bumper guards or require undercarriage mounting.

Therefore, it is an object of the present invention to provide a bumper guard applicable to a wide variety of bumper and body shapes without having to modify the bumper or bumper support. Most, if not all, vehicles in the United States are fabricated with a front and rear bumper or body portion having a substantially flat license-plate mounting area or fixture typically located at the center thereof, although some vehicles may have the mounting area to one side. These mounting areas provide for at least one fastening device, usually two or more, for mounting a license-plate to the vehicle. Typically, the mounting area or fixture comprises a preexisting, standard arrangement of fastener recesses, nuts, or clips for receiving a fastening device, such as a bolt, screw, snap, or stud, etc., to mount the license-plate. The mounting fixture could also comprise studs, screws, or bolts extending from the mounting area for insertion into a mounting recess in the license-plate, to which a nut is attached to fasten the license plate. According to the invention, the bumper guard mounts to the license-plate mounting fixture diminishing the need for any special bumper guard mounting device. Thus, one may obtain the benefits of a bumper guard without having to modify the bumper or bumper support by attaching it to preexisting fastening fixture.

The fastening device used to mount the bumper guard to the vehicle may be, and preferably is, the same fastening device used to mount the license-plate to the bumper guard; for example, bolts extend through recesses in the license-plate and aligned recesses in the bumper guard to be received in recesses in the vehicle license plate fixture for mounting both the license-plate and the bumper guard to the vehicle. Alternatively, bolts or studs extend from the mounting area or fixture and the license plate and bumper-guard are fastened to the bolts or studs with suitable nuts. In the alternative the license-plate can be separately mounted to the bumper guard and the bumper-guard separately mounted to the vehicle; for example, first screws extend through recesses in the bumper guard to be received in the license plate mounting fixture recesses for mounting the bumper guard to the vehicle while second fastening devices, such as screws or clips, extend through the license-plate recesses and attach to the bumper guard for mounting the license-plate to the bumper guard. One beneficial application associated with the use of separate fasteners is, for example, a car dealer can exchange dealer plates between various cars without having to remove the license-plate from the bumper guard by simply attaching and detaching the bumper guard with the license-plate remaining connected thereto.

Furthermore, a bumper guard having a mounting plate similarly sized to the dimensions of a license-plate and having recesses configured to align with the preexisting fasteners, e.g., screw receiving recesses or studs, located at the license-plate mounting or fixture area would be capable of easily mounting to many types of bumpers or vehicle body work despite the shape of the surrounding bumper or body portion. Accordingly, this allows one to avoid ordering a custom bumper guard particularly designed to accommodate a certain vehicle's bumper or body shape, and allows generic use of a bumper guard with varying bumper and body designs.

Even further, should the bumper guard itself become scratched, nicked or bent it is easily removable by removing it from the preexisting vehicle fixture and placing another guard in its place. Placing a removable or non-removable cover such as foam and/or rubber over a portion of the bumper guard creates a soft exterior so that scratches and other such damage to another vehicle are not easily caused by contacting the guard. Also, such a cover creates a repairable/replaceable surface for maintaining a clean appearance.

Accordingly, it is an object of the present invention to provide a bumper guard mountable to a vehicle via a preexisting license-plate mounting fixture, such as preexisting screw or bolt recesses.

It is a further object of the present invention to provide a bumper guard mountable to the preexisting license-plate mounting fixture that is capable of accommodating a license-plate without obstructing the visibility thereof.

Another object of the present invention is to provide a bumper guard having a mounting plate shaped to be substantially concealed by a license-plate.

It is yet another object of the present invention to provide a bumper guard mountable to the bumper's preexisting fixtures, e.g., recesses, having an integrated shock absorption system for absorbing an initial impact.

A further object of the present invention is to provide a removable or non-removable cover such as foam and/or rubber over a portion of the bumper guard of the present invention to maintain a soft exterior, protect its surface from scratches and maintain a neat appearance with a repairable/replaceable surface.

An even further object of the present invention is to provide a bumper guard having vertically extending bumper guard arms mountable to the vehicle's preexisting mounting area fastening fixtures, e.g., recesses or studs, for contacting a second bumper having a different height.

Other features and advantages of the present invention will become apparent from the following description of the invention which refers to the accompanying drawings.

BRIEF DESCRIPTION OF THE DRAWINGS

For the purposes of illustrating the invention, there is shown in the drawings forms which are presently preferred, it being understood, however, that the invention is not limited to the precise arrangements and instrumentalities shown. The features and advantages of the present invention will become apparent from the following description of the invention that refers to the accompanying drawings, in which.

DETAILED DESCRIPTION OF PREFERRED EMBODIMENTS OF THE INVENTION

Figure 1:
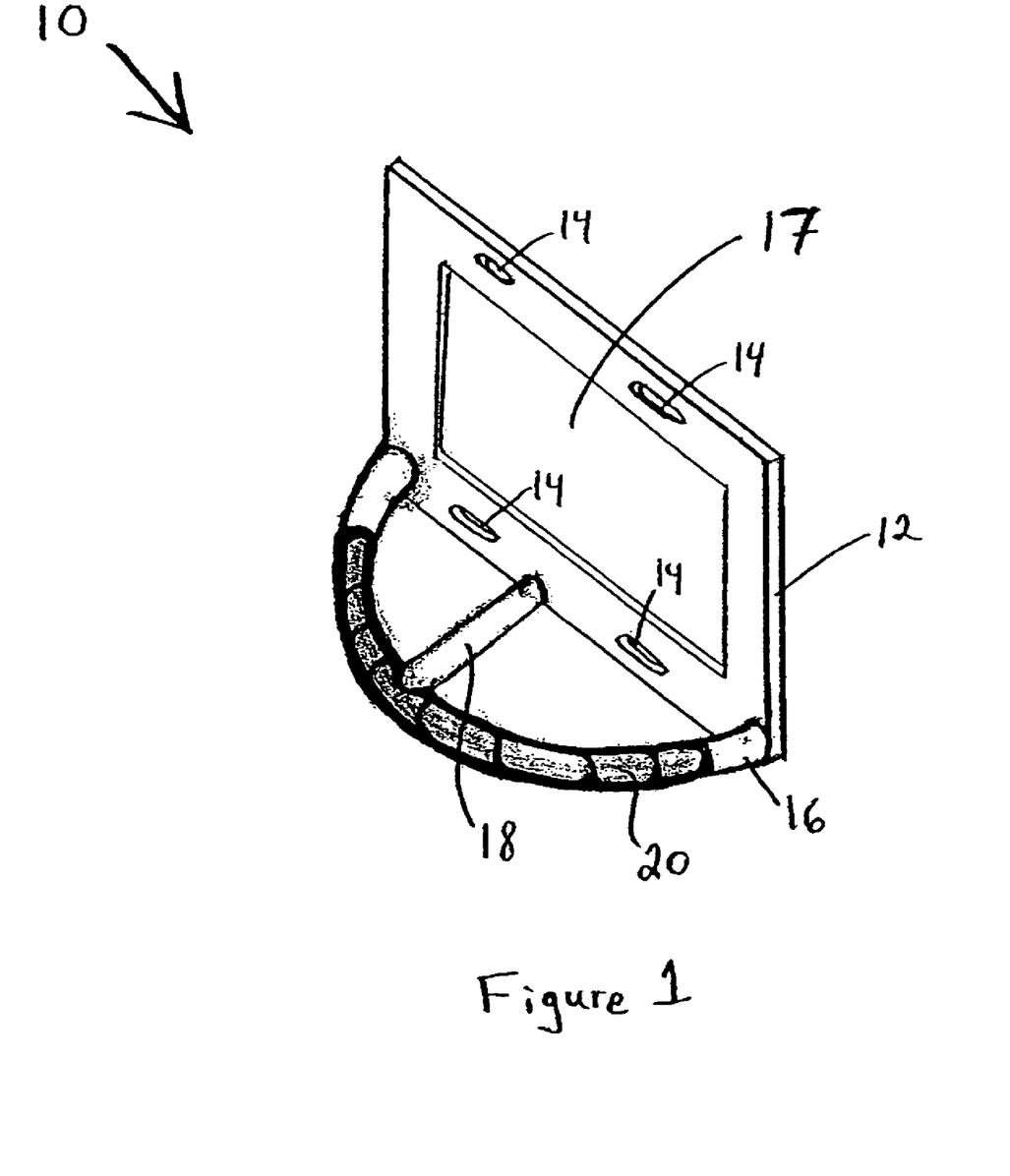
FIG. 1 illustrates a perspective view of a bumper guard including a license-plate frame having a guard bar extending therefrom in accordance with an embodiment of a bumper guard of the present invention.
Figure 2A:
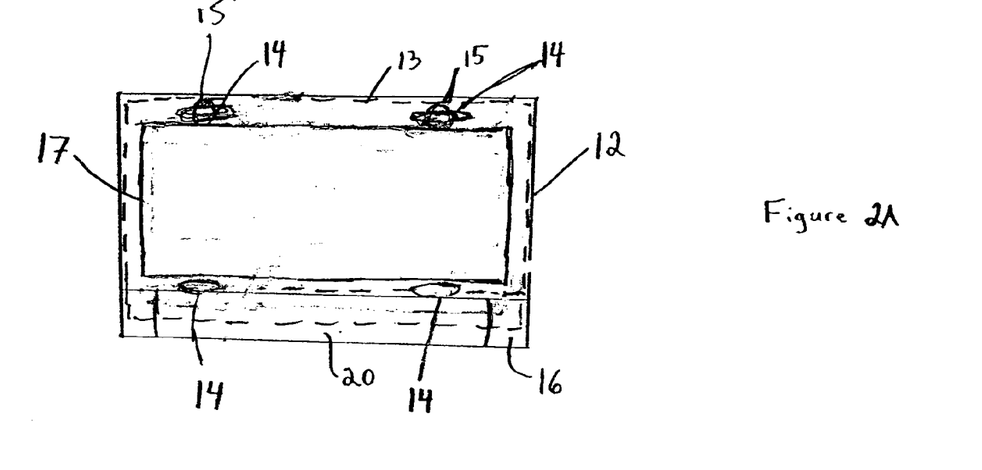
FIG. 2A shows a front view of the bumper guard illustrated in FIG. 1 in accordance with an embodiment of the present invention.
Figure 2B:
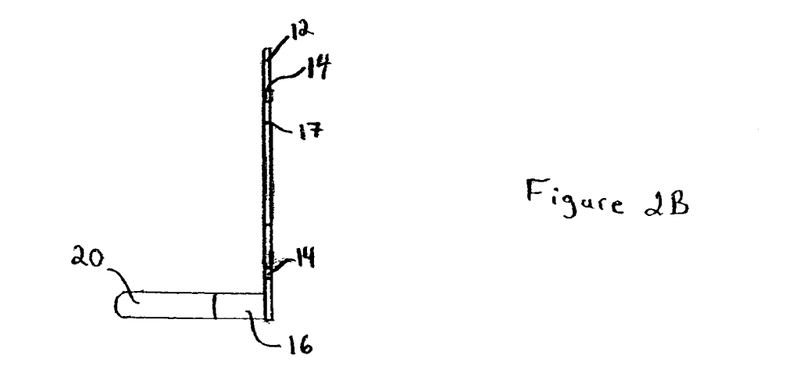
FIG. 2B illustrates a side view of the bumper guard shown in FIG. 1 in accordance with an embodiment of the present invention.
Figure 2C:
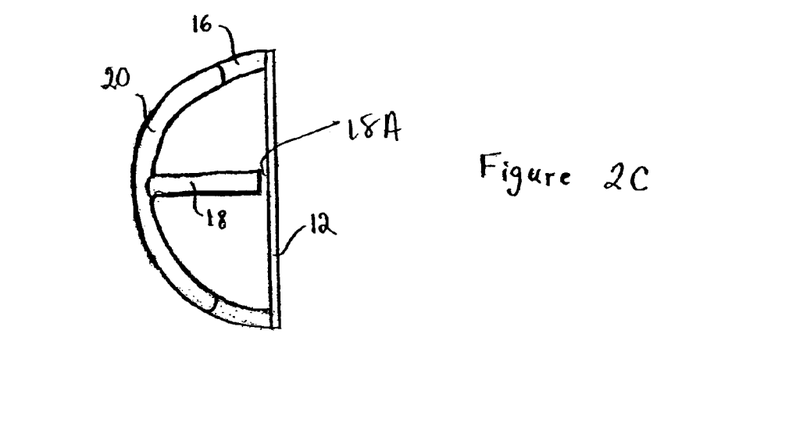
FIG. 2C shows a top view of the bumper guard illustrated in FIG. 1 in accordance with an embodiment of the present invention.

FIGS. 1 through 2C illustrate a bumper guard 10 having a substantially flat and rectangular base plate 12 having at least one recess 14 therein and preferably having a central opening 17 for making the plate lighter, pliable or able to accommodate slight protrusions from the vehicle. The recesses 14 are disposed at locations on the plate 12 to align with a standard arrangement of recesses 26 (see, FIGS. 3 and 4) provided on a bumper or body 24 of a vehicle for receiving a fastening device in order to mount a license-plate 13 thereto. At least one guard arm 16 preferably extends perpendicularly from the plate 12. Here, the arm 16 extends along one of the long sides of the rectangular plate 12. As shown, the arm 16 is a metal tube having a first and second end, the arm 16 extends from plate 12 along a long side of the rectangular plate 12 with the first and second ends connecting to opposing corners of the respective long side. The guard bar 16 is shown to form an approximately semi-circular arc along the respective long side of the plate 12, whereby the arm 16 is furthest from the plate 12 at its center. This semi-circular shape allows for the guard bar 16 to extend furthest from the plate 12 at its center while providing no corners or edges to get snagged or tangled with external items, i.e., clothing, brush, vegetation, or other vehicles, etc. The guard bar 16 and plate 12 can be made of any metallic or plastic combination according to a desired impact resistance and surface finish. The recesses 14 are provided along both top and bottom long sides of the plate 12 so that one can selectively inversely mount the bumper guard 10 to a vehicle bumper or body with the guard bar 16 extending along either the top or bottom long sides of plate 12. For extra support to the guard bar 16, a support bar 18 can extend from the plate 12 to connect to the approximate center of the guard bar 16. Also, shown is a rubber or foam cover 20 snugly fit or wrapped around a portion of the guard bar 16 to form a cleanable soft surface. If impacted, the cover 20 can protect the bar 16 from nicks and scratches. Also, if the cover 20 is damaged it can be easily and inexpensively replaced.

Figure 3:
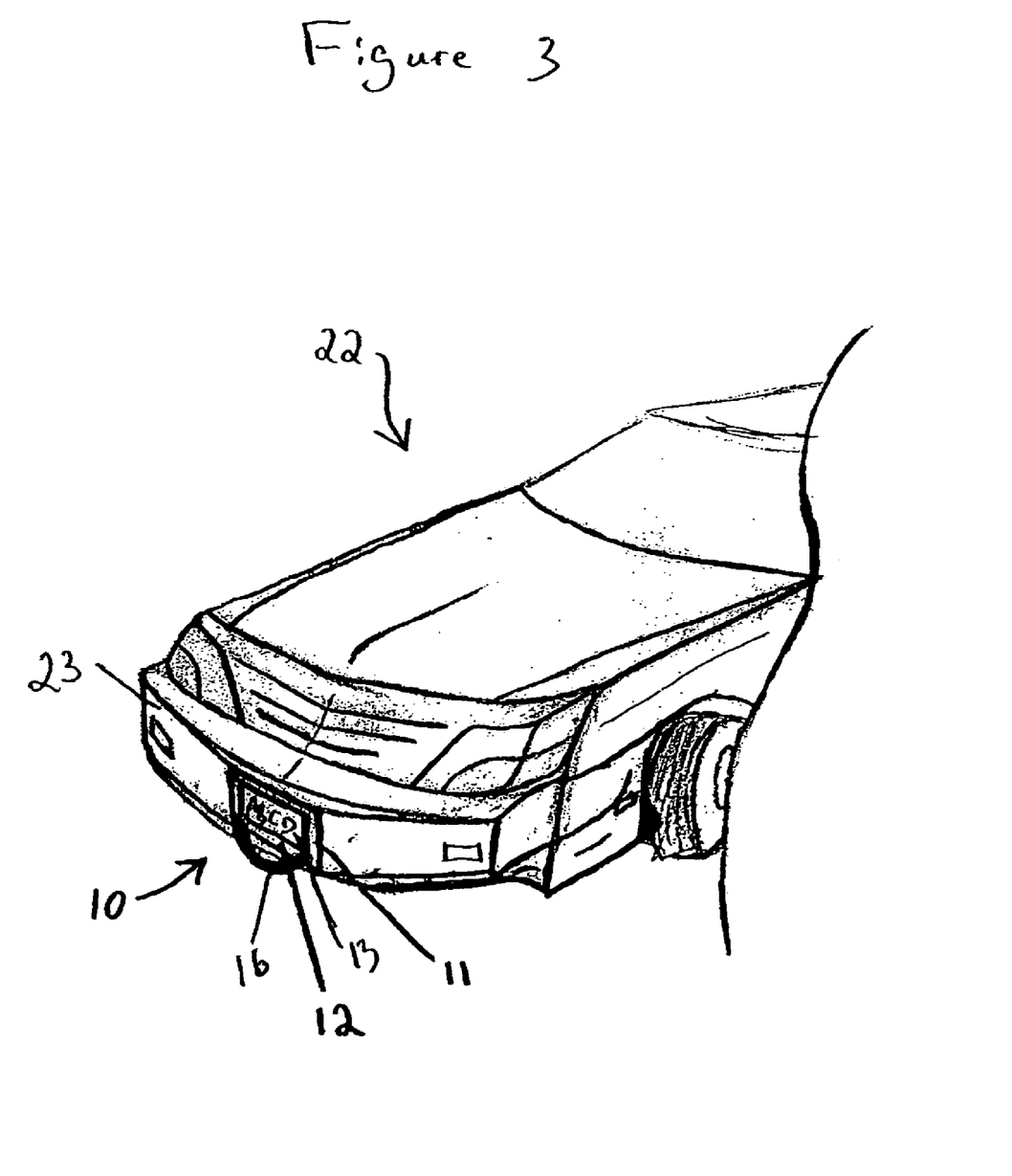
FIG. 3 illustrates a prospective view of the bumper guard in accordance with an embodiment of the present invention mounted to a vehicle's bumper.

Regarding FIG. 2A, dashed lines illustrate a standard license-plate 13 having recesses 15. The dashed lines illustrate how a substantial portion of the surface area of plate 12 would be concealed by the license-plate 13 (dashed lines) and how the recesses 15 of the license-plate 13 would align with recesses 14. The portion of the plate 12 above the guard bar 16 can be smaller or the same size as the license-plate outline 13. It can be larger to the extent that the license-plate area of the vehicle allows it. As illustrated thus far, plate 12 is substantially the same size as a license-plate 13, but only slightly longer along the short side of the rectangle for accommodating guard arm 16. Also, guard arm 16 is anchored at the plate's corners and preferably does not extend beyond the long side of the plate 12. As can be seen in FIG. 3, this compact configuration enables the bumper guard 10 to be easily mounted to most bumpers or vehicle bodies, because most bumpers or vehicle bodies 23 provide a substantially flat license-plate mounting area 11 for mounting a license-plate 13 and can therefore accommodate a similarly shaped bumper guard plate 12. Furthermore, the bumper guard 10 can have an additional guard arm 16 and necessary support 18 extending from the plate 12 at an opposing side of the plate 12 or any other remaining side of the plate 12. In the illustrated embodiment, support 18 is spaced away from plate 12 at 18A (see FIG. 2C) in order to allow insertion of the license plate if positioned in front of plate 12.

Although the above description and FIG. 2A shows the license plate on top of the plate 12, it should be understood that the license plate can be disposed behind the plate 12. In such case, the size of the border area of plate 12 should be designed so that it does not interfere with display of the license plate. Also, some jurisdictions may not allow the license plate to be disposed behind the plate 12 for legal reasons, in which case, the license plate would, of course, be placed in front of plate 12. However, there is no technical reason why the license plate could not be disposed behind the plate 12. Should the license plate be disposed behind plate 12, plate 12 can have suitable advertising or other indicia disposed thereon.

FIG. 3 illustrates a perspective view of the bumper guard 10 in accordance with an embodiment of the present invention mounted to a bumper configuration 23 of a vehicle 22. The traditional placement of the license-plate mounting area 11 at the central extremity of bumpers 23 provides ideal placement of the bumper guard 10 because of its likelihood of being the furthest forward (on the front of a vehicle) and furthest rear (on the rear of a vehicle) extremities of a vehicle, and thereby, in most instances, the first point of contact if impact were to occur. Therefore, once mounted, the guard arm 16 becomes the most likely point of contact and thereby effectively prevents the guarded area of the bumper from being directly impacted. Such a bumper guard arrangement is extremely effective at low speed or low force impacts associated with parking a vehicle. As shown in FIG. 3, the bumper guard 10 is also capable of accommodating the license-plate 13 when mounted on the bumper 23 via the preexisting license-plate mounting fixtures without obstructing the view of the license-plate 13. The guard arm 16 is shown to be positioned along the bottom side of the plate 12, but the bumper guard 10 could also be mounted in an inverted position thereby placing the guard arm 16 along a top side of the plate 12, or may be accompanied by additional guard arms extending form adjacent or parallel sides of the plate 12.

Figure 4:
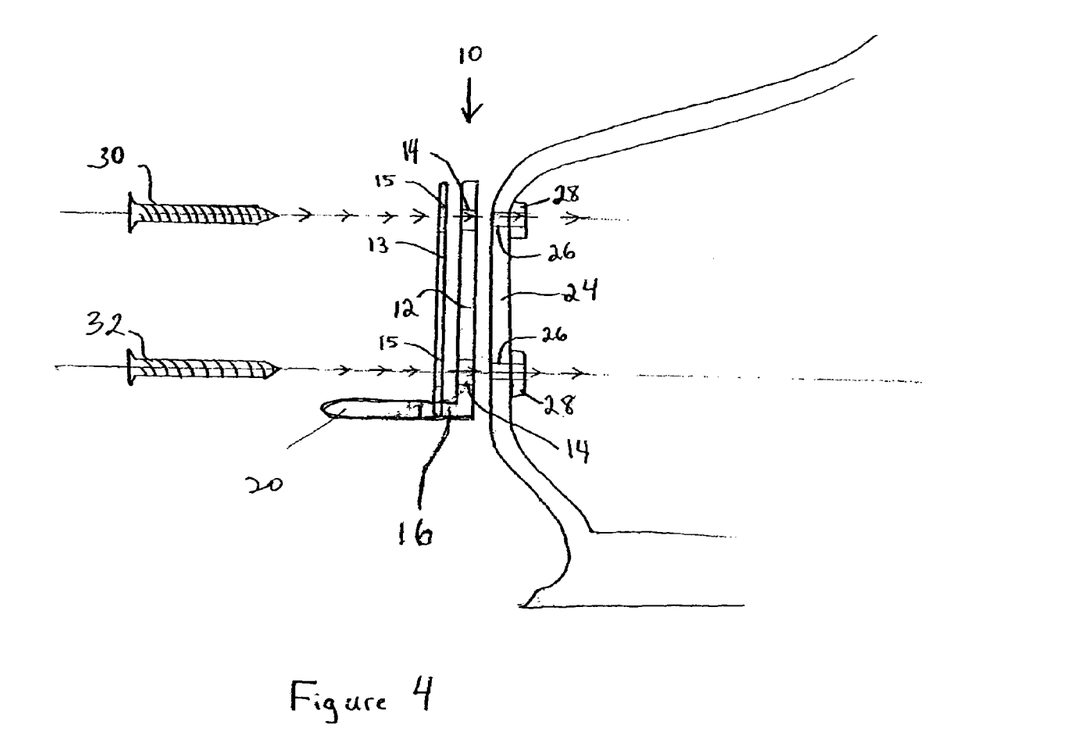
FIG. 4 shows a cross-sectional, exploded side view of mounting a license-plate and a bumper guard in accordance with an embodiment of the present invention to a bumper cover.

FIG. 4 shows a cross-sectional, exploded, side view of mounting a license-plate 13 and a bumper guard 10 to a bumper cover or vehicle body 24 in accordance with an embodiment of the present invention. Vehicles often have bumper arrangements which have inner support members connected to the frame of the vehicle and an outer decorative bumper cover 24 encasing the support members. The bumper cover 24 is often provided with a preexisting fastening fixture, in this instance one or more screw receiving recesses 26 for accommodating screws 30 and 32, or other fastening devices for mounting the license-plate thereto. An alternative arrangement, not illustrated, can include a fastening fixture including at least one stud, bolt or screw extending from the vehicle to be received through the recess of the license-plate and/or bumper guard and by at least one nut or clip. As depicted, the plate 12 of the bumper guard 10 is placed between the license-plate 13 and the bumper cover 24 with recesses 14, 15 and 26 aligned for receiving screws 30 and 32 therethrough. The screws 30 and 32 are received by clips or nuts 28 at the inner side of the bumper cover 24 to secure the license-plate 13 and bumper guard 10 to the bumper 24. If recesses 26 are not provided in the bumper 24, then they can be created by drilling or puncturing the bumper 24 at the desired location. It should be noted that not all four openings 14 need be provided. As is often the case, only two fasteners (top or bottom two) need be used to fasten the license-plate 13 and the bumper guard 10 through the aligned recesses of the bumper or vehicle body. Also, the fastening device or devices mounting the license-plate to the bumper guard can be different from the fastening device or devices holding the bumper guard to the vehicle. For example, a first screw can extend through aligned recesses of the license-plate and bumper guard for mounting the license-plate to the bumper guard while a second screw extends through aligned recesses of the bumper guard and the vehicle fixture member for mounting the bumper guard to the vehicle.

Figure 5A:
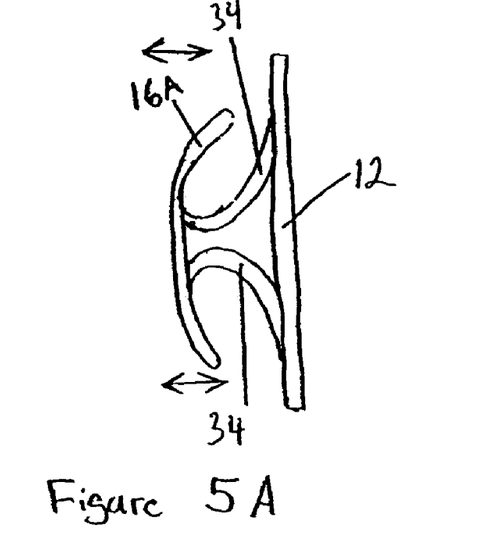
FIG. 5A illustrates a top view of a bumper having a bumper guard arm flexibly mounted to a base plate guard in accordance with another embodiment of the present invention.
Figure 5B:
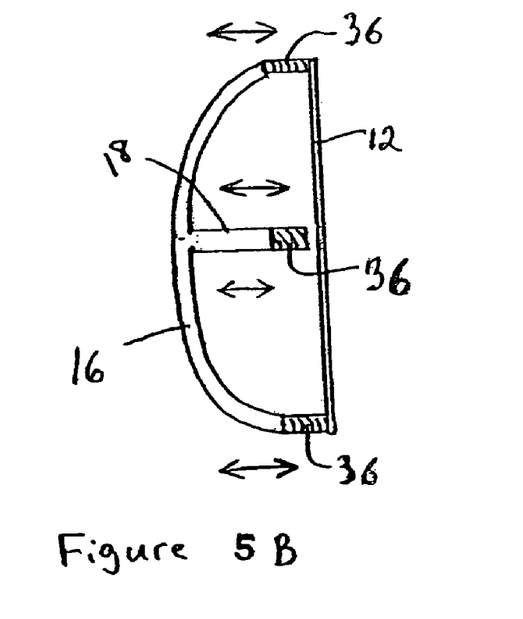
FIG. 5B shows a top view of a bumper guard having a bumper guard arm spring mounted to a base plate in accordance with a further embodiment of the present invention.

FIGS. 5A and 5B illustrate top views of a bumper guard 10 having a bumper guard arm 16A and 16B flexibly mounted to a substantially flat base plate 12 via a shock absorbing member or members 34 or 36. Regarding FIG. 5A, a guard arm 16A is formed in the shape of an elongated, flattened arc extending substantially parallel to a long side of the rectangular plate 12. The arm 16A is suspended away from the plate by a shock absorbing mount 34 configured to deform a predetermined amount in order to absorb the forces associated with an impact on bar 16A. Regarding, FIG. 5B, the bumper guard 10 is shown similar to that described in FIGS. 1-2C; however, the main difference being that the ends of the guard arm 16 and support arm 18 are now connected to the plate 12 via a shock absorbing device or devices, here shown as stiff coil springs 36. Therefore, when arm 16B is impacted, springs 36 absorb the impact thereby further aiding in the avoidance of structural damage to the bumper or vehicle body. Similarly to the embodiment of FIG. 1, space 18A is provided between center spring 36A and plate 12 to allow insertion of the license plate.

Figure 6A:
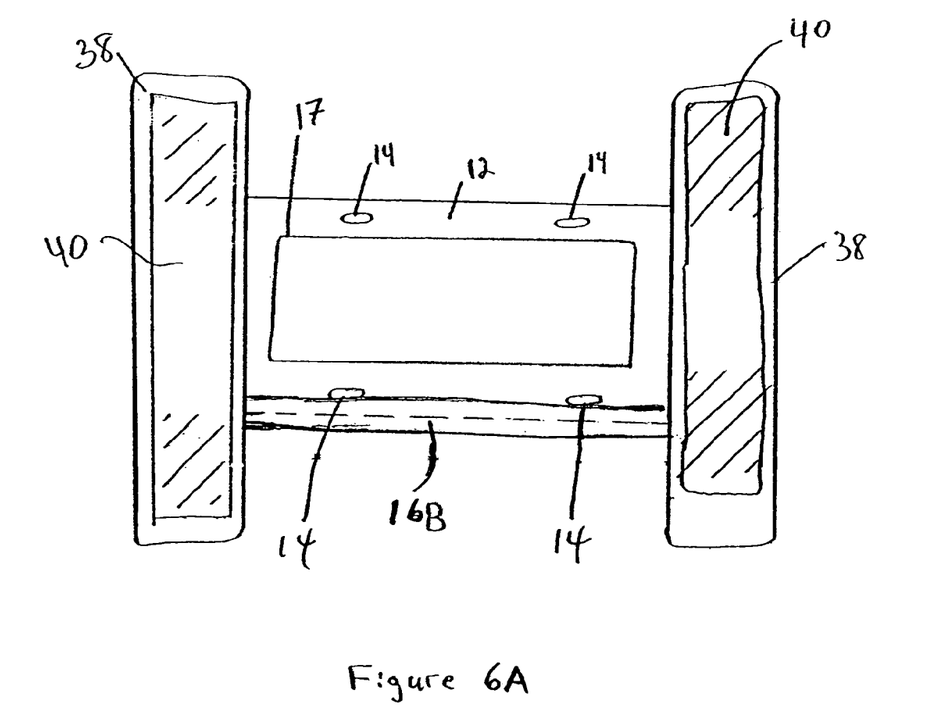
FIG. 6A illustrates a front view of a bumper guard having vertically extending bumper guard arms in accordance with yet a further embodiment of the present invention.
Figure 6B:
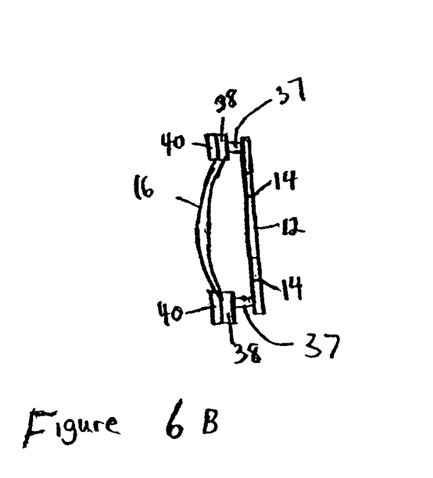
FIG. 6B shows a top view of the bumper guard having vertically extending bumper guard arms in accordance with an embodiment of the present invention.
Figure 6C:
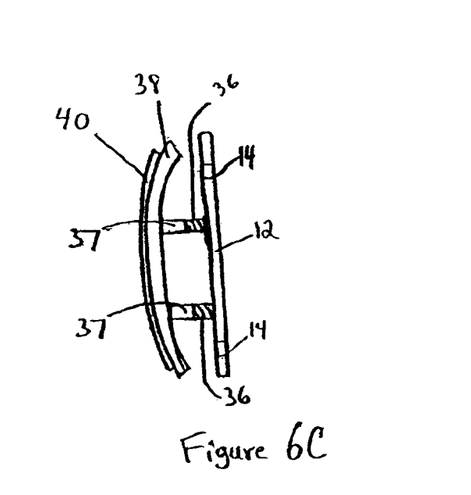
FIG. 6C illustrates a side view of the bumper guard having vertically extending bumper guard arms in accordance with an embodiment of the present invention.

FIGS. 6A through 6C illustrate a bumper guard 10 having a substantially flat and rectangular base plate 12 including at least one recess 14 extending therethrough and at least one mounting member 37 extending perpendicularly therefrom. At least one guard arm 38 is connected to a distal end of the mounting member 37. The guard arm 38 is shown to have a flattened, arc shape and extends parallel to the short side of the rectangular plate. The recesses 14 are strategically positioned along a first and/or second long side of plate 12 to align with a standard arrangement of recesses 26 (see, FIGS. 3 and 4) provided on a bumper 24 for receiving a fastening device in order to mount a license-plate 13 thereto. Therefore, when mounted, the guard arm 38 extends vertically thereby enabling the bumper guard 10 to contact bumpers having different heights than the one it is mounted to. The guard arm 38 has a surface furthest from and facing away from the plate 12 that may be covered with a cover 40 adhesively mounted or fastened thereto. The cover 40 provides a cleanable and easily replaceable surface. Referring to FIG. 6C, the mounting member 37 can also be connected to the plate 12 via a shock absorber such as a spring coil 36. Further, a connecting arm 16B may optionally be provided connecting the arms 38 to provide further support and protection.

Although the present invention has been described in relation to particular embodiments thereof, many other variations and modifications and other uses will become apparent to those skilled in the art. Therefore, the present invention should be limited not by the specific disclosure herein, but only by the appended claims.

What is claimed is:

1. A bumper guard mountable to a vehicle license-plate mounting fixture, the mounting fixture being adapted to receive a license-plate having at least one mounting recess, the bumper guard comprising:

a first member having a front and rear surface, whereby said rear surface is configured to be disposed adjacent said mounting fixture;

said first member being adapted to receive said license plate adjacent said front or rear surface;

at least one recess in said first member arranged to align with a fastening member of said vehicle license plate mounting fixture; and at least one guard arm extending a predetermined distance from said front surface of said first member and having a length from side to side and having a curved shape extending substantially along the entire length, a center of said guard arm extending furthest from said surface of said first member, wherein said first member is mountable to said vehicle license plate fixture fastening member by at least one fastening device.

2. The bumper guard as recited in claim 1, further wherein said license-plate is mountable to said first member by the at least one fastening device.

3. The bumper guard as recited in claim 2, wherein said at least one fastening device mounting said first member to the vehicle and said at least one fastening device mounting the license-plate to the first member comprises the same fastening device.

4. The bumper guard as recited in claim 3, wherein the vehicle license-plate mounting fixture comprises at least one recess, and the fastening device is received in the recess, thereby fastening the license-plate and the bumper guard to the vehicle.

5. The bumper guard as recited in claim 3, wherein the vehicle license-plate mounting fixture comprises at least one stud, and the stud fastens the license-plate and the bumper-guard to the vehicle.

6. The bumper guard as recited in claim 1, wherein said first member comprises a plate member.

7. The bumper guard as recited in claim 6, wherein said plate member further comprises a central opening in said plate member.

8. The bumper guard as recited in claim 7, wherein said plate member is rectangularly shaped having two long and two short sides, and further wherein said license-plate essentially conceals said plate member when mounted thereto.

9. The bumper guard as recited in claim 8, wherein said guard arm extends a predetermined distance from said front surface of said plate member along at least one of said sides of said plate member.

10. The bumper guard as recited in claim 9, wherein said guard arm includes first and second ends, said ends remaining within the perimeter of said plate member.

11. The bumper guard as recited in claim 9, wherein said ends of said arm are connected to opposing corners of said respective side of said plate member, whereby said arm bows away from said plate between said corners.

12. The bumper guard as recited in claim 11, wherein said arm is furthest from said plate member substantially at a center of said arm's length.

13. The bumper guard as recited in claim 12, further comprising at least one support arm extending between said guard arm and said plate member for added strength and protection.

14. The bumper guard as recited in claim 9, wherein said guard arm includes first and second ends, said ends extending beyond the perimeter of said plate member.

15. The bumper guard as recited in claim 14, wherein two further guard arms are oppositely positioned along the short sides of said plate member.

16. The bumper guard as recited in claim 1, wherein two guard arms are oppositely positioned along the long sides of said plate member.

17. The bumper guard as recited in claim 1, further comprising a cover fitted to wrap around said guard arm.

18. The bumper guard as recited in claim 1, wherein said fastening member of said license-plate fixture includes at least one recess, clip or nut for receiving at least one screw, bolt, or rivet.

19. The bumper guard as recited in claim 1, wherein said fastening member of said license-plate fixture includes at least one stud, screw, rivet, or bolt to be mated with at least one recess, clip, or nut.

20. The bumper guard as recited in claim 1, further comprising a shock absorber interposed between said guard arm and said first member to provide a region of displacement between said arm and said first member for absorbing an impact to said arm.

21. The bumper guard as recited in claim 20, wherein said shock absorber includes at least one stiff coil spring.

22. The bumper guard as recited in claim 20, wherein said shock absorber includes at least one flexible rod extending between said arm and said first member.

23. The bumper guard as recited in claim 1, wherein the license plate is adapted to be disposed on said front surface of said first member.

24. The bumper guard as recited in claim 1, wherein the license plate is adapted to be disposed between the first member and said mounting fixture.

25. A bumper guard mountable to a vehicle license-plate fixture where the fixture has a preexisting arrangement of recesses for receiving at least one fastener for fastening a license-plate having at least one aligned mounting recess, the bumper guard comprising:

a plate member having front and rear surfaces, whereby said rear surface is configured to be disposed adjacent said vehicle license-plate fixture, said plate member being adapted to receive said license plate adjacent said front or rear surface;

at least one recess in said plate member arranged to align with at least one of said preexisting fixture recesses; and at least one guard member extending a predetermined distance from said front surface of said plate member and having a length from side to side and having a curved shape extending substantially along the entire length, a center of said guard member extending furthest from said surface of said plate member, wherein said bumper guard is mountable to said vehicle by said at least one fastener extending through any of said preexisting fixture recesses, said aligned plate member recess and said at least one aligned mounting recess of said license-plate.

26. The bumper guard as recited in claim 25, wherein said guard member comprises a mounting member and at least one guard arm having a front and rear and having said length defined by first and second ends, said mounting member connecting said guard arm to said plate member.

27. The bumper guard as recited in claim 26, wherein said ends of said arm extend beyond the perimeter of said plate member.

28. The bumper guard as recited in claim 26, wherein said mounting member connects said rear of said arm to said plate member front so that said arm is positioned away from said plate member front and said arm front faces away from said plate member front.

29. The bumper guard as recited in claim 28, wherein said mounting member includes a shock absorber.

30. The bumper guard as recited in claim 25, wherein said plate member is rectangular in shape having two long and two short sides, further wherein said license-plate essentially conceals said plate member when mounted thereto.

31. The bumper guard as recited in claim 30, wherein two arms are oppositely arranged along the short sides of said rectangular plate member.

32. The bumper guard as recited in claim 31, wherein said ends of said guard arms remain within the perimeter of said plate member.

33. The bumper guard as recited in claim 31, wherein said guard arms are connected to said mounting members at opposing corners of a respective side of said plate member, whereby said arms bow away from said plate member between said corners.

34. The bumper guard as recited in claim 26, further comprising at least one support member extending between said guard arm and said plate member for added strength and protection.

35. The bumper guard as recited in claim 34, wherein said support member includes a shock absorber.

36. The bumper guard as recited in claim 25, further comprising a cover fitted to wrap around said guard arm.

37. The bumper guard as recited in claim 25, wherein said plate member further comprises a central opening in said plate.

38. The bumper guard as recited in claim 25, wherein said guard member has a semi-circular shape extending away from said plate member.

39. The bumper guard as recited in claim 25, wherein the license plate is adapted to be disposed on said front surface of said plate member.

40. The bumper guard as recited in claim 25, wherein the license plate is adapted to be disposed between the plate member and said license plate fixture.

* * * * *